INVENTOR.
RUSSELL W. STINEMAN

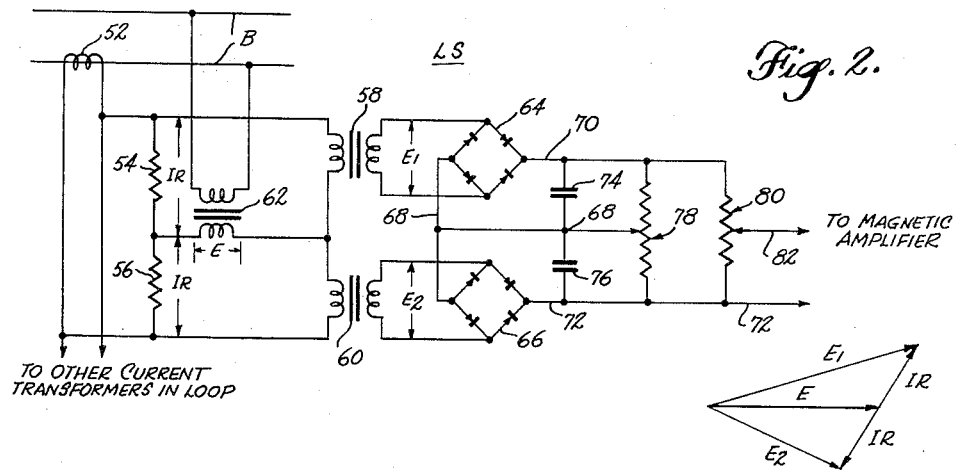
Fig. 2.
Fig. 3.
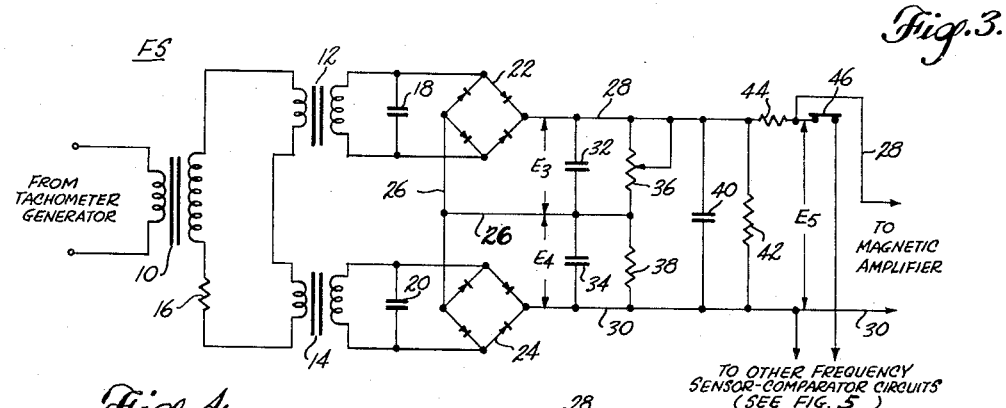
Fig. 4.
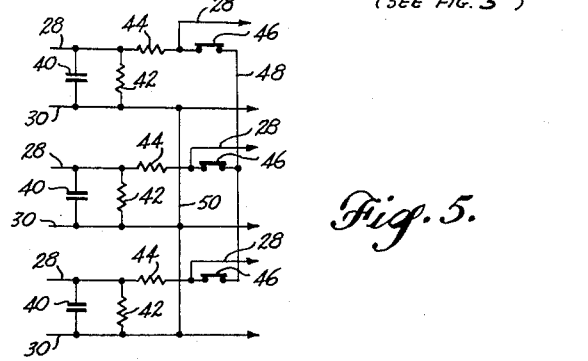
Fig. 5.
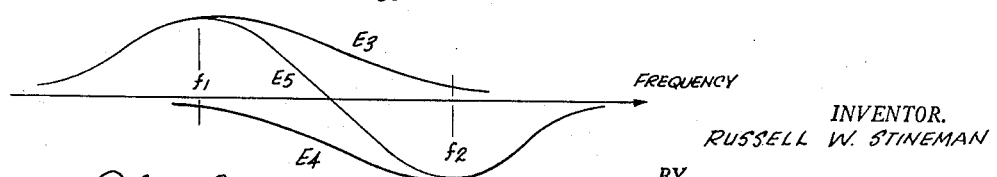
Fig. 6.
INVENTOR.
RUSSELL W. STINEMAN
BY
ATTORNEYS INVENTOR.
RUSSELL W. STINEMAN
BY
Reynolds, Beach & Christensen
ATTORNEYS Feb. 3, 1959 R. W. STINEMAN 2,872,591
POWER EQUALIZATION APPARATUS FOR MULTIPLE ALTERNATOR SYSTEMS
Filed June 18, 1956 5 Sheets-Sheet 5

INVENTOR.
RUSSELL W. STINEMAN
BY
ATTORNEYS

… … …

2,872,591

POWER EQUALIZATION APPARATUS FOR MULTIPLE ALTERNATOR SYSTEMS

Russell W. Stineman, Seattle, Wash., assignor to Boeing Airplane Company, Seattle, Wash., a corporation of Delaware Application June 18, 1956, Serial No. 591,836

13 Claims. (Cl. 290—4)

This invention relates to improvements in control apparatus for multiple alternator systems, and more particularly concerns the stable equalization of power among the paralleled alternators of such systems. The novel principles of the invention apply to equalization of real power and also or alternatively to equalization of reactive power among the alternators. The invention is herein illustratively described by reference to the presently preferred embodiments thereof as developed for aircraft installations; however, it will be recognized that certain variations and modifications therein may be made without departing from the novel and characterizing features involved. The invention is illustrated as applied to a single phase system but it may also be applied to multiphase systems.

The term "equalization" as it is employed herein with respect to power division among the alternators is not intended necessarily to be limited to its restricted meaning of simple arithmetic equality of power but includes the broader meaning of a division of power in proportion to the respective working capacities or predetermined ratings of the different alternators. Thus, if one alternator has a normal working capacity or predetermined rating of one hundred kilowatts of real power and another fifty kilowatts of real power, then, in the sense herein used, the term "equalization of power division" or some equivalent term, when applied to these alternators has reference to a loading of the first alternator at twice the loading of the second alternator. The same meaning is attached to the case of reactive power equalization or like terminology.

In a multiple or paralleled alternator system real power division among the alternators depends ultimately upon the settings of prime mover speed or torque control devices. This is true because flow of equalizing currents among the alternator output windings necessarily constrains the alternators to rotate at equal speeds, so that any differences in torque being exerted by the different prime movers are necessarily reflected in differences of real power assumed by the alternators driven thereby. In prior systems slight differences occurring between different alternator speed references created or aggravated load unbalances between the alternators because of the resulting speed error signals caused thereby to be applied to the alternator prime mover controls.

Similarly, reactive power division among the paralleled alternators depends ultimately upon the setting of voltage regulator or other excitation control devices. Flow of reactive currents between alternator output windings necessarily maintains equal output voltages, so that any differences in voltage regulator energization are necessarily reflected in differences in reactive power assumed by the alternators controlled thereby. In prior systems slight differences occurring between different alternator voltage references created or aggravated load unbalances between the alternators because of the resulting voltage error signals caused thereby to be applied to the alternator excitation controls.

It is, of course, desirable in all multiple alternator systems to equalize real power among the alternators or to equalize reactive power among the alternators, and usually both. Only in this manner is it possible to insure a maximum over-all system load capacity without overloading of any particular alternator. An object of the present invention is to provide novel apparatus automatically accomplishing that result while permitting stable regulation of system frequency in the case of real power equalization and stable regulation of system voltage in the case of reactive power equalization.

Another object of the invention is to provide a multiple alternator system wherein the paralleled alternators are controlled to operate as a system with equalized power division and with regulated speed or frequency, and wherein any such alternator and its load may be disconnected from the others while providing for the continued operation of the latter in a similarly controlled system and for the continued operation of the disconnected alternator independently of the others, this objective being accomplished with both the disconnected alternator and the remaining interconnected alternators being operated at substantially the same regulated speed as that of the system before the change. A related object is to provide a multiple alternator system wherein the paralleled alternators are controlled to operate as a system with equalized reactive power division and with regulated voltage, and wherein any such alternator and its load may be disconnected from the others while providing for continued operation of the latter in a similarly controlled system and for the continued operation of the disconnected alternator independently of the others, this objective being accomplished with both the disconnected alternator and the remaining interconnected alternators operated at substantially the same regulated voltage as that of the system before the change.

Still another object is the provision of a speed-regulated multiple alternator system meeting the applicable objectives stated above, while being controlled to operate at more reliably or predictably regulated speed from an effectively single speed reference than prior types of multiple alternator systems using a single speed reference device. A related object is the provision of a voltage regulated multiple alternator system meeting the applicable objectives stated above while being controlled to operate at more reliably or predictably regulated voltage from an effectively single voltage reference than prior types of multiple alternator systems using a single voltage reference device.

Described in brief general terms, the improved multiple alternator system applied to the equalization of real power and regulation of alternator speed (i. e. output frequency) comprises means for controlling the individual alternator prime mover torque in accordance with the integral summation of individual alternator speed error and load division error signals. As herein disclosed, individual alternator speed error signals are developed by means comparing the difference between actual speed of such alternator and a reference speed individual to that alternator with the average of similar differences derived for all the alternators. Moreover, individual alternator load division error signals are developed by means comparing the difference between individual alternator load and the average of the loads of all the alternators. Such individual alternator speed error signals and load division error signals are added together and preferably integrated, before or after being added, and thereupon applied to the control of the alternator prime mover torque. The result of such an arrangement applied to all the paralleled alternators is zero speed error in the system and zero load equalization error therein. Moreover, the system speed being effectively controlled by a single speed reference, namely the average of all the individual alternator speed references, stability of load division and speed are achieved, as well as greater reliability or predictability of speed regulation than that achieved in former systems using only a single speed reference source. Furthermore, arrangements are provided for sectionalization of the system by disconnecting one or more alternators from those remaining while permitting all to continue in operation, such that any disconnected alternator may be controlled by its own speed reference whereas those still connected together may continue to be operated as a system having the arrangements previously mentioned wherein all the alternators are controlled by the average of the individual speed references.

The improved multiple alternator system applied to the equalization of reactive power and regulation of system voltage comprises means for controlling the individual alternator voltage regulator devices in accordance with the summation of individual alternator integrated voltage error and reactive power division error signals. As herein disclosed, individual alternator voltage error signals are developed by means comparing the difference between actual voltage of the alternator and a reference voltage individual to that alternator with the average of similar differences derived for all the alternators. Moreover, individual alternator reactive power division error signals are developed by means comparing the difference between individual alternator reactive power delivery and the average of reactive power delivery of all the alternators. Such individual alternator voltage error signals and reactive power division error signals are added together, and preferably integrated, before or after being added, and thereupon applied to the control of the alternator voltage regulation device or alternator excitation control means. The result of such an arrangement applied to all the paralleled alternators is zero voltage error in the system and zero reactive power division or equalization error therein, whereas use of a non-integrating voltage regulator will produce zero reactive power division error but a small voltage error. Moreover, the system voltage being effectively controlled by a single voltage reference, namely the average of all individual alternator voltage references, stability of reactive power division and voltage regulation are achieved, and greater reliability or predictability of voltage regulation than that achieved in former systems using only a single voltage reference source for the entire system. Furthermore, arrangements are made for sectionalization of the system by disconnecting one or more alternators from those remaining, and any disconnected alternator may be operated independently, controlled by its own voltage reference while those still connected together may continue to be operated as a system having the arrangements previously mentioned wherein all alternators are controlled effectively by a single voltage reference.

It will of course be understood that the combining of resultant difference signals by an addition process, with or without integration thereof, takes place in the system as a condition upon which is based the merging of the correlated control requirements to make them compatible, so that in the case of prime mover torque control the requirement of speed (or frequency) correction is made compatible with the requirement of real power equalization, whereas in the case of alternator exciter control the requirement of voltage regulation is made compatible with the requirement of reactive power division. The relative weighting of the respective signals resulting from frequency deviation or load unbalance determines the predominance or priority given to one or the other and the extent to which each is satisfied in the making of a correction in prime mover torque. The same is true with respect to the voltage deviation and reactive power unbalance signals, and their effect and the degree to which they are satisfied or corrected by a change of alternator field excitation. This weighting of the correlated signals is of course an inherent function and consequence of the relative gain or sensitivity of the respective circuit channels deriving or amplifying such signals, respectively.

Integration of the signals which are combined for control purposes is of course a means to achieve the effect of high amplification in the signal channels with relatively stable, low-gain amplification circuits; however, integration is not essential in all cases.

The invention is described in its preferred form herein, which includes for convenience of description and illustration the assumption that the combined signals in each of the two control applications are matched or equally weighted in their resultant effect on prime mover torque and alternator field excitation, respectively. It is also based on the utilization of integration of signals prior to application thereof to the control of prime mover torque or alternator field excitation; however, it will be recognized as mentioned above that this is a refinement and not an essential condition in all cases.

These and other features, objects and advantages of the invention will become apparent from the following description by reference to the accompanying drawings.

Figure 2 is a schematic diagram of load error sensing circuit means associated with one alternator.

Figure 3 is a vector diagram illustrating the principle of operation of the circuit shown in Figure 2.

Figure 4 is a schematic diagram of a frequency error sensing circuit associated with one alternator.

Figure 5 is a simplified switching diagram showing the arrangement of interconnections between the frequency error sensing circuits of the different alternators.

Figure 6 is a voltage versus frequency graph illustrating operation of the circuit shown in Figure 4.

Figure 12 is a schematic diagram illustrating the combination of real power and reactive power equalization means and speed and voltage regulating means in a multiple alternator system, the view illustrating the combined apparatus associated with one of the alternators of the system.

Figure 1:
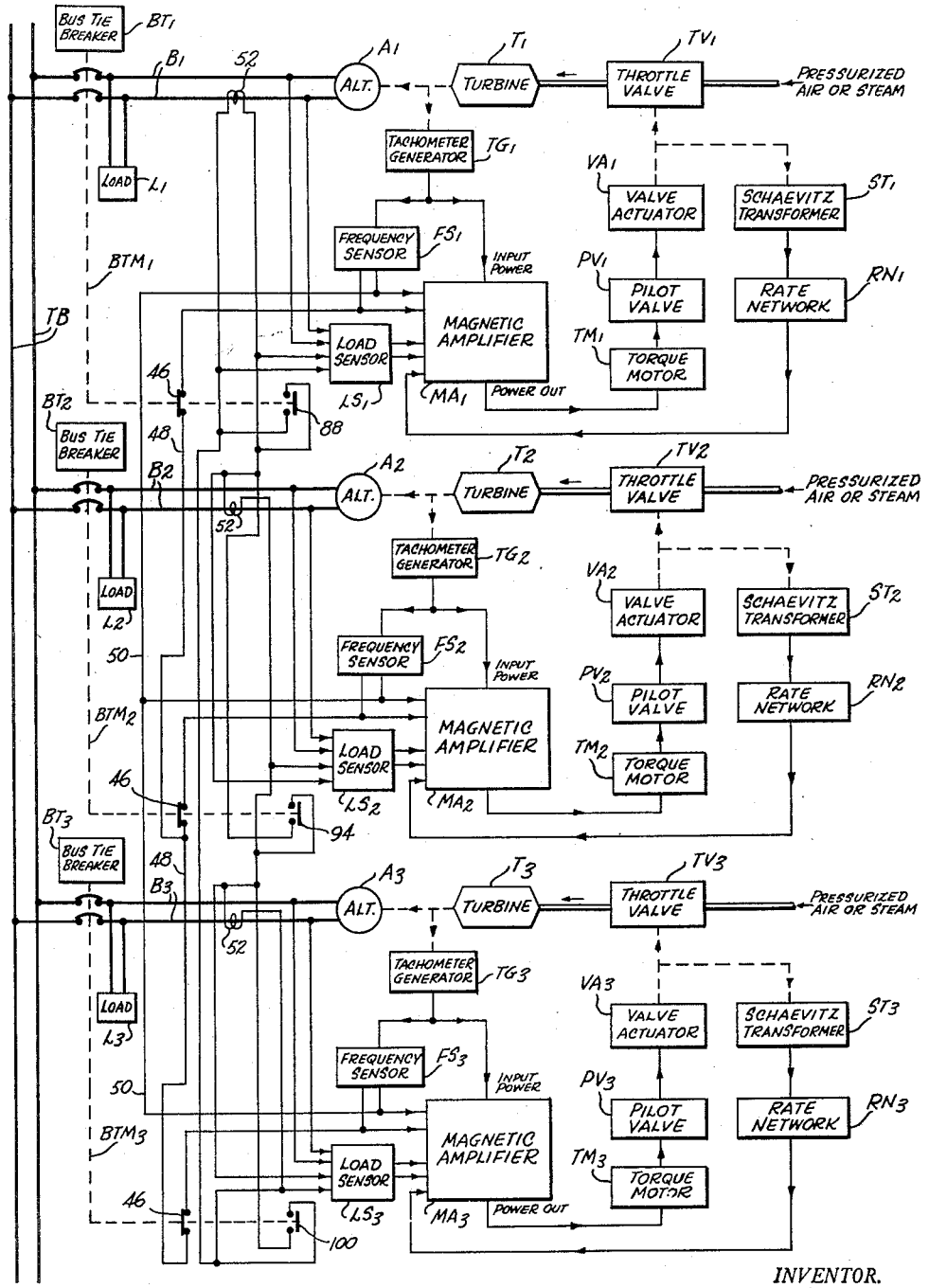
Figure 1 is a schematic diagram of the improved multiple alternator system including means for real power equalization and speed regulation of the paralleled alternators.

Referring to Figures 1 to 6, inclusive, illustrating the system for maintaining equalization of real power among the paralleled alternators while regulating system speed or frequency, three alternators are shown in the diagram, but it will be understood that any number greater than one may be employed within the scope of the invention. The three alternators A1, A2 and A3, driven by the respective turbines T1, T2 and T3, are connected through their individual alternator buses B1, B2 and B3 to alternator loads L1, L2 and L3, respectively. Associated with each individual alternator load bus is a bus tie breaker by which the respective load buses are interconnected through the tie bus TB. Thus the normally closed bus tie breaker BT1 connects the alternator A1 to the tie bus whereas the bus tie breakers BT2 and BT3 do likewise with respect to the alternators A2 and A3. As long as the bus tie breakers are closed, therefore, the alternators operate in parallel. These bus tie breakers may be arranged to receive control signals from different types of devices in accordance with well known techniques for protecting multiple alternator systems in the event of certain fault or overload conditions. Such devices are not illustrated in the diagram in order to simplify the figure, but it will be understood that each bus tie breaker is arranged to be operated selectively in accordance with one or more different conditions which may develop requiring disconnection of the respective alternators from the tie bus. It will be noted, however, that the contactors of the bus tie breakers BT1, BT2 and BT3 are positioned in the conductors between the individual alternator loads and the tie bus, so that in the event a bus tie breaker opens, it will still be possible for the load of the associated alternator to be supplied by operation of that alternator while the remainder of the system continues to operate as a system.

The turbine T1 is energized by pressurized air, steam or other medium in accordance with the setting of a throttle valve TV1, which may be of any suitable type adjusted in the well known manner to increase or decrease turbine speed, hence torque applied to the alternator. Similar throttle valves TV2 and TV3 are provided for the turbines T2 and T3. The throttle valve TV1 is controlled by a valve actuator VA1, which may comprise a hydraulic jack or other device capable of producing mechanical movement of the throttle valve in one sense or the other. The valve actuator VA1 is controlled by a pilot valve PV1 or equivalent device for applying energization to the valve actuator so as to shift the throttle valve one way or the other when the pilot valve is displaced to one side or the other of its neutral position, and the pilot valve in turn is controlled by a reversible torque motor TM1 or equivalent device which produces a shift in the position of the pilot valve in one sense or the other in accordance with the application of plus or minus error signals to the torque motor. Such a servo control arrangement for the throttle valve TV1 constitutes an integrating type of arrangement wherein the throttle valve retains its existing setting in the absence of any corrective signals being applied to the torque motor, but is moved in position progressively during continued application of a signal of one polarity or the other applied to the torque motor. Other arrangements to produce signal integration may be employed in lieu of that illustrated. Similar valve actuators, pilot valves and torque motors are associated with the throttle valves of the remaining turbines, and these bear similar reference characters with the appropriate subscript numerals relating them to the associated alternators.

Plus or minus error signals are applied to the respective torque motors by magnetic amplifiers MA1, MA2 and MA3, respectively, which are controlled to produce an output response which represents the summation of two input signals to be integrated by the turbine control apparatus, one such control signal being from a means designated a frequency sensor FS and the other from a means designated a load sensor LS, as shown. Each alternator has a similar frequency sensor and load sensor connected to control the magnetic amplifier associated therewith.

To each such frequency sensor FS is applied an alternating voltage produced by a tachometer generator TG, of a frequency which is necessarily directly proportional to alternator speed or output frequency, since the tachometer generator is driven by or from the same shaft that drives the alternator. Within the frequency sensor the frequency of this signal is compared with the central frequency of two tuned circuits having slightly different resonance frequencies arranged with oppositely polarized rectification means to produce an output response of one polarity or the other depending on the sign of the difference between said applied signal frequency and said central or reference frequency. By suitably interconnecting the frequency sensor outputs the response of each is compared with the average of all to produce a control signal for the associated magnetic amplifiers. The resultant control signals applied by the interconnected frequency sensors to their respective magnetic amplifiers are proportional to the respective differences between the responses of the associated frequency sensors and the average response of all the frequency sensors, so that in effect the alternators are all governed as to speed or frequency by a single reference, namely the average of the reference frequencies of all the frequency sensors, as will be explained more fully hereinafter.

As shown in the example (Figure 1) tachometer generators TG1, TG2 and TG3 may also be used as the sources of energizing power for the associated magnetic amplifiers.

The magnetic amplifier control inputs received from the individual load sensors associated therewith represent signals proportional respectively to the difference between individual alternator loading and the average loading of all the alternators. The load sensor circuit producing such control input signals will be described hereinafter. In general, the function of each is to detect real power being delivered by its associated alternator and to produce a magnetic amplifier control signal which is proportional to the difference between that value and the average of the values of real power being delivered by all the alternators.

Referring in greater detail to Figures 1, 4, 5 and 6, each frequency sensor or frequency error sensor, as it may be termed, includes an input transformer 10 energized from the tachometer generator of the associated alternator. The secondary of this transformer is connected in series with the primaries of two matched transformers 12 and 14 and a current limiting resistance 16. The secondaries of the respective transformers 12 and 14 are tuned by condensers 18 and 20, respectively, to slightly different resonant frequencies the central or median value of which is termed the reference frequency of the frequency sensor. Ideally each alternator frequency sensor would have the identical reference frequency of all the alternators, but in practice it has been found that it is not possible to establish or maintain perfect identity, and in past multiple alternator systems even slight reference frequency differences produced aggravation of any load unbalance between the paralleled alternators. The present invention solves both problems and it is only necessary that the different reference frequencies be equal to an approximate degree.

The tuned secondary of transformer 12 is impressed across a bridge rectifier 22 and that of transformer 14 is likewise impressed across a similar bridge rectifier 24. Corresponding intermediate points of the individual rectifiers are interconnected by a common conductor 26 whereas the opposing intermediate point of rectifier 22 is connected to an output conductor 28, and that of rectifier 24 is connected to an output conductor 30. The output voltage of the side of the circuit including rectifier 22 is therefore the voltage labeled E3 measured between conductors 28 and 26, and the output voltage of the side of the circuit associated with rectifier 24 is the voltage E4 taken between the conductors 26 and 30. Filter condensers 32 and 34 are connected from the respective output conductors to the middle conductor 26, as are loading resistances 36 and 38, respectively. Finally a filter condenser 40 and loading resistor 42 are connected across the output conductors 28 and 30 to provide final filtering for the output direct voltage from the circuit as a whole, which is the difference between the respective potentials of conductors 28 and 30. If the input frequency from the tachometer generator applied to transformer 10 is nearer to the resonant frequency of the tuned secondary of transformer 12 than it is to that of transformer 14, then the sensor circuit output voltage E5 appearing across output conductors 28 and 30 will be of one polarity, and of a magnitude approximately proportional to the difference between tachometer frequency and the average of the tuned circuit frequencies (i. e. the reference frequency) within the range of operation of the circuit. On the other hand, the polarity of voltage E5 will be reversed if the tachometer frequency comes nearer to the resonant frequency of the tuned secondary of transformer 14 than it is to that of transformer 12. This is illustrated in Figure 6, wherein the tuned frequencies of the respective transformer secondaries 12 and 14 are designated $f1$ and $f2$ and wherein the voltage graph lines E3, E4 and E5 correspond to the respective voltage responses indicated in Figure 4. A current limiting resistance 44 is interposed in series with one of the conductors, such as conductor 28.

The frequency sensor output conductors 28 and 30 are connected to the appropriate ends of an input winding (not shown) of the associated magnetic amplifier MA so as to energize such winding with an output response current of one direction or the opposite direction depending upon the tachometer generator frequency difference from the reference frequency of the particular frequency sensor, disregarding for the moment interconnections between the frequency sensor outputs.

In order to interconnect the different frequency sensors for purposes previously mentioned, a normally closed switch 46 connects one of the output conductors, such as conductor 28, to a common conductor 48 which is connected through similar normally closed switches in the frequency error sensing circuits associated with the other alternators, as depicted in Figure 5. The other output conductors (30) of the respective frequency error sensing circuits are interconnected by a common conductor 50. With this arrangement of paralleling interconnections between the frequency sensor circuits of the different alternators it may be demonstrated that the actual energizing current which flows through the control winding of the magnetic amplifier connected across the output conductors 28 and 30 of any one frequency sensor will represent the difference between the departure of alternator frequency from the average of the reference frequencies for all the frequency sensors, as desired. Thus, the magnetic amplifier for each alternator in the system delivers speed control signals to the throttle valve control means of the associated alternator which are effectively based on a single reference frequency, namely the average of the reference frequencies of all the frequency sensor circuits in the system. Not only is this arrangement productive of frequency stability in the system, but by averaging the reference frequencies of the individual frequency sensor circuits as a basis for system frequency regulation, various difference effects such as those of temperature changes on the individual tuned circuits tending to shift the individual reference frequencies may be averaged out, so that the system will be regulated at a speed which is more accurate or predictable than in the case of an actual single reference frequency standard.

Referring to Figure 1, it will be noted that the switch 46 of the frequency sensor for alternator A1 will be opened with opening of the bus tie breaker for the particular alternator, the diagram illustrating a mechanical connection BTM1 between the bus tie breaker and particular switch. A similar arrangement is provided in the case of the other alternators, as shown. The use of these mechanical connections in the diagram is purely for illustration, although it may represent a practical case, yet it will be recognized that electrical coordination may also be provided for causing any frequency sensor to be disconnected from the other frequency sensors when the alternator of the first frequency sensor is disconnected from the other alternators in the system. It will be observed that opening of a switch 46 of a disconnected alternator, while removing the coordination between the frequency sensors, nevertheless leaves the individual alternator frequency sensor to provide signals to its associated magnetic amplifier in order to regulate speed of that alternator in accordance with the reference frequency of the frequency sensor. Thus the disconnected alternator may continue to operate independently of the other alternators and the latter may continue to operate as a system as before.

Referring to Figures 1, 2 and 3, and with reference to the function and arrangement of the load sensor means, it will be noted that each individual load sensor comprises a current transformer 52 inductively linked with one of the alternator buses B so as to produce an output voltage which is proportional to individual alternator load current. This current transformer winding is connected across two resistances 54 and 56, connected in series. Also connected across these series resistances are the primaries of two similar transformers 58 and 60, likewise connected in series. The secondary of a voltage transformer 62 is connected between the junction between the primaries of transformers 58 and 60 and that of resistances 54 and 56. The primary of voltage transformer 62 is connected across the individual alternator buses in order to apply alternator output voltage to such transformer. The secondary of transformer 58 is connected across the rectifier bridge 64, and that of transformer 60 is similarly connected across the rectifier bridge 66. Corresponding intermediate points on the bridges 64 and 66 are interconnected by the common conductor 68. Bridge 64 has an output conductor 70 and bridge 66 has an output conductor 72. A filter condenser 74 is connected between conductors 70 and 68 and a similar filter condenser 76 is connected between conductors 68 and 72. The winding of a balancing potentiometer 78 is connected across conductors 70 and 72, and the adjustable wiper of this potentiometer is connected to conductor 68 so as to permit balancing the circuit. The winding of an output potentiometer 80 is connected across conductors 70 and 72. The output of this circuit is derived from between the wiper of potentiometer 80 and conductor 72. In the example the output connections include the conductors 72 and 82 which are connected to the appropriate input or control winding (not shown) of the associated magnetic amplifier.

Such magnetic amplifier control winding (not shown) is energized with voltage of one polarity or the other, depending upon the relationship between voltages applied to the load sensor circuit. Figure 3 illustrates the relationship of these voltages. The vector E represents the voltage of the secondary of transformer 62 and is proportional in phase and magnitude to the phase and magnitude of alternator output voltage. One of the vectors IR representing the voltage drop across one of the resistances 54 and 56, equals half the voltage across the current transformer 52, whereas the other vector IR represents the voltage drop across the other of these two resistances and is equal in magnitude to but opposite in phase from the first vector IR. It will be noted that the vectors IR will have zero length when no load is being delivered by the associated alternator. Moreover, these vectors will be perpendicular to the vector E if purely reactive load is being delivered by such alternator, representing zero real power delivery. Thus, the angular relationship between the vectors IR and E is determined by the power factor of the load being served by the particular alternator, and the component of the vector IR which is in phase with the vector E represents real current supplying the load. The vectors E and IR on the two sides of the circuit in Figure 2 are added together by the transformers 58 and 60, respectively, so that the secondary voltage of transformer 58 represents the resultant vector E1, for example, and the secondary voltage of transformer 60 represents the resultant vector E2. The vectors E1 and E2 are of equal length, and the circuit delivers no output voltage between output conductors 72 and 82 either if the vectors IR are of zero length, representing no load on the alternator, or if these vectors are perpendicular to the vector E, representing the case of all reactive power delivery.

The current transformers 52 associated with the load sensors of the alternators are normally all connected in a series loop. As a result the actual secondary voltage developed across the winding of any current transformer 52, representing the sum of the voltage drops across the resistances 54 and 56, is proportional to the difference between the load current of the individual alternator and the average load current of all the alternators. Consequently, the output voltage of each load sensor circuit developed between output conductors 72 and 82 thereof is a quantity which both in magnitude and polarity is proportional to the difference between the load being delivered by the associated alternator and the average load being delivered by all of the alternators. This is the signal which is applied to the input of the magnetic amplifier and which is added together in such amplifier with the frequency error signal so as to position the throttle valve TV of the particular alternator in accordance with the integral sum of these load and frequency error signals. As a result of this arrangement the alternators are not only regulated to operate at the same frequency, which is an accurately determined frequency as previously described, but they are continuously driven to maintain equalization of load between the alternators. The satisfaction of these two conditions by the use of the integral summation effect of the magnetic amplifier and throttle valve actuating arrangement is unique inasmuch as it is possible to satisfy the condition of zero speed error at the same time the condition of zero load division error is satisfied. A stable system of maximum load capacity and accurately regulated speed results.

As in the case of the frequency error sensing circuits being disconnectible one from the others in the event the associated alternator is disconnected from the other alternators, so are there arrangements for isolating or disconnecting the load sensor and current transformer of any disconnected alternator from the load sensors and current transformers of the other alternators. Referring to Figure 1, the current transformer 52 associated with alternator A1 is disconnected or isolated electrically from the loop of current transformers without interrupting the loop circuit of the remaining current transformers by closure of a switch 88 short-circuiting the first-mentioned current transformer, hence by-passing it in the loop. This also isolates the load sensor LS1 from the remaining load sensors. The current transformers 52 of the alternators A2 and A3 are now connected in a series arrangement to permit the alternators A2 and A3 to be controlled as a system without interference from the load sensor LS1 and its associated current transformer. Likewise, the normally open switch 94 connected across the current transformer 52 of alternator A2 may be closed when alternator A2 is disconnected from the system, thereby to place the current transformers of alternators A1 and A3 in a loop excluding the current transformer of alternator A2. Alternator A3 has a similar load sensor and current transformer isolating switch 100 which accomplishes the same pupose in the case of that alternator as with the other two alternators. If desired, the switches 46 and 88 may be simultaneously operated by the mechanical connection BTM1, to the bus tie breaker BT1, and the corresponding sets of switches for the remaining alternators may be similarly operated by the respective mechanical connections BTM2 and BTM3 to their bus tie breakers, as shown. Thus, when any alternator is disconnected from the other alternators in the system, not only is the frequency error sensing means of that particular alternator disconnected from the corresponding means of the other alternators so as to provide independent regulation of alternator speed without disturbing the rest of the system, but the load sensor of the disconnected alternator is also disconnected from the other load sensors to avoid disturbing the operation of the remainder of the system.

In order to avoid possible hunting in the system it is, of course, desirable to provide a rate correction to the output of the magnetic amplifier. This may be done by converting mechanical position of the throttle valve into an electrical signal and deriving therefrom a current which is proportioned to the rate of change of this electrical signal for application to an input or control winding of the magnetic amplifier in a sense to provide damping. In the illustration the transducer means for making this conversion is represented by the block labeled "Schaevitz Transformer," which represents a circuit using the well known Schaevitz linear differential transformer having a core movable in relation to two output windings the voltages of which are rectified in opposite sides of a balanced circuit to produce an output signal of one polarity or the other, depending upon movement of the throttle valve to one side or the other of a median position. This positional voltage is then applied through a suitable differentiating network comprising a series resistance and condenser, for example, in order to derive the desired damping voltage representing the rate of change of positional voltage. Other techniques are available for stabilizing and the details thereof are only of secondary concern herein. The derivative voltage developed by the Schaevitz transformer ST is applied through a rate network RN to an input winding (not shown) of the associated magnetic amplifier.

Referring to Figures 7 to 11, inclusive, and to the system for equalizing reactive power among the paralleled alternators while regulating system voltage, components which correspond to those in Figure 1 bear similar reference characters. The field windings of these respective alternators A1, A2 and A3 are designated F1, F2 and F3. These are controlled by the exciters EX1, EX2 and EX3, respectively. The individual exciters in turn are controlled by voltage regulation apparatus comprising, in each alternator section of the system, the rectifier and filter combination RF, reactive power sensor RPS, magnetic amplifier MB and stabilizing network. Each magnetic amplifier MB1, MB2 or MB3, is individually controlled by input signals from two different sources. One source comprises the output of voltage error sensing means, and the other source comprises the output from reactive power error sensing means. The arrangement is such that an output signal from the magnetic amplifier, preferably the integral of the sum of the inputs, is impressed on the exciter field winding, either before or after integration, as desired, and in a sense and with a magnitude which maintains the reactive power division equal among the alternators while maintaining system voltage at a predetermined regulated value.

Figure 10:
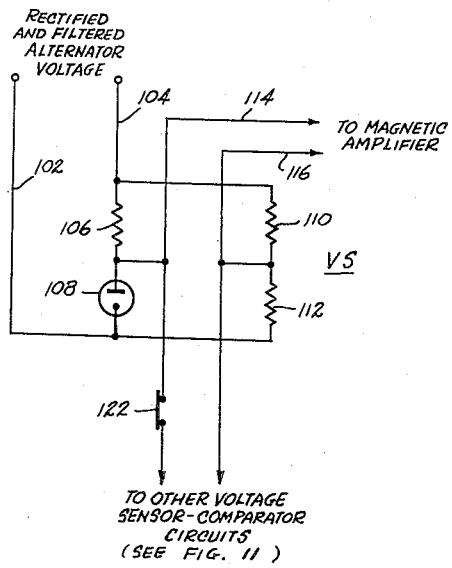
Figure 10 is a schematic circuit diagram of voltage error sensing circuit means associated with an individual alternator.

In accomplishing these ends, rectifier and filter circuits RF1, RF2 and RF3 are connected across the output terminals of the respective alternators to produce direct voltages proportional to alternator output voltage. These voltages are applied to voltage sensors VS1, VS2 and VS3, respectively, of a nature which may be as illustrated in Figure 10. The rectified voltage from the rectifier and filter combination is impressed on the conductors 102 and 104 across which are connected, in series, the resistance 106 and the VR tube 108 of the conventional gaseous discharge type. Also connected across the conductors 102 and 104 are the series resistances 110 and 112. The output conductors 114 and 116 from the voltage sensor circuit are connected respectively to the junction between the resistance 106 and VR tube 108 and to that between the two resistances 110 and 112, respectively. Conductors 114 and 116 are connected across a control winding (not shown) of the particular magnetic amplifier associated with the voltage sensor.

Figure 11:
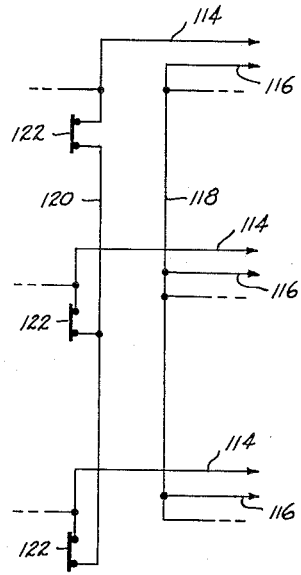
Figure 11 is a diagram showing the connection between the individual voltage error sensing circuits.

As shown in Figure 11, the output conductors 114 and 116 of each voltage sensor are normally connected to the corresponding conductors of the other voltage sensors in the system. Thus the conductors 116 are all connected together through the common conductor 118. The conductor 114 of each voltage sensor circuit is connected to a common conductor 120 through a normally closed switch 122. The switch 122 is arranged to be opened when the associated alternator is disconnected from the system, which thereby disconnects the voltage sensor circuit from the other voltage sensors so as to avoid interference with continued operation of the latter. For that purpose the switches 122 may be connected for actuation by a mechanical connection BTM of the associated bus tie breaker so as to operate simultaneously with the operation of the bus tie breaker. Other arrangements may be made of a conventional nature or otherwise for operating the appropriate switches 122 when any of the associated alternators are disconnected from the system.

Figure 7:
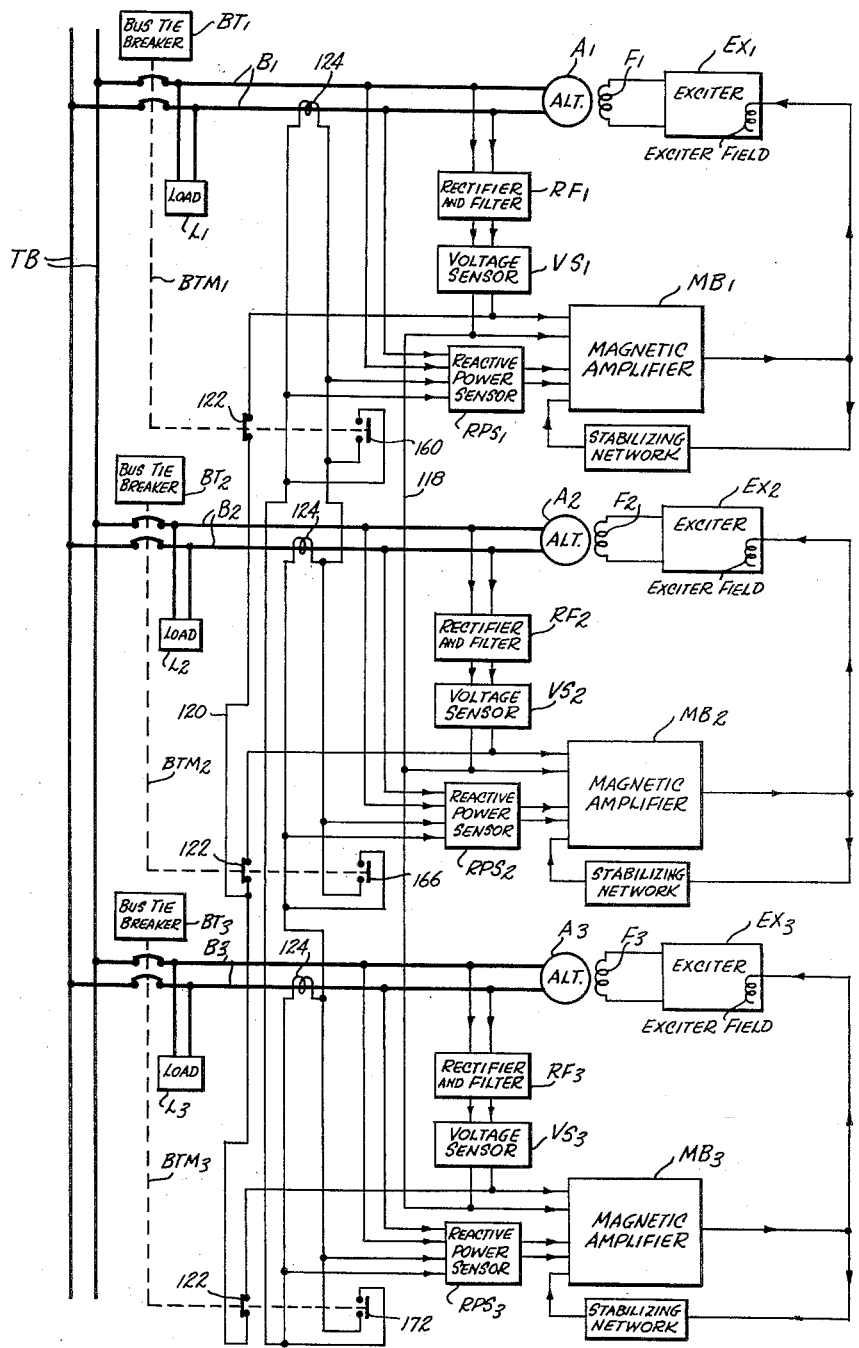
Figure 7 is a schematic diagram of a multiple alternator system incorporating reactive power equalization means and associated means for regulating system voltage in accordance with the invention.

It will be noted from the arrangement shown in Figures 7, 10 and 11 that the actual voltage signal which reaches the magnetic amplifier control winding from each voltage sensor comprises the difference between the independently developed voltage of the individual voltage sensor circuit and the average of the independently developed voltages of all the voltage sensors. This is due to the arrangement of the voltage sensor circuit output connections being in parallel relationship. The result of this arrangement is that the system voltage is regulated effectively in accordance with the average of the voltage references established by the different VR tubes 108 rather than any one VR tube. Consequently, system voltage is regulated more accurately or more predictably at a predetermined value than may otherwise be possible, particularly in view of the changeable characteristics of VR tubes in general with use and temperature variations.

Figure 8:
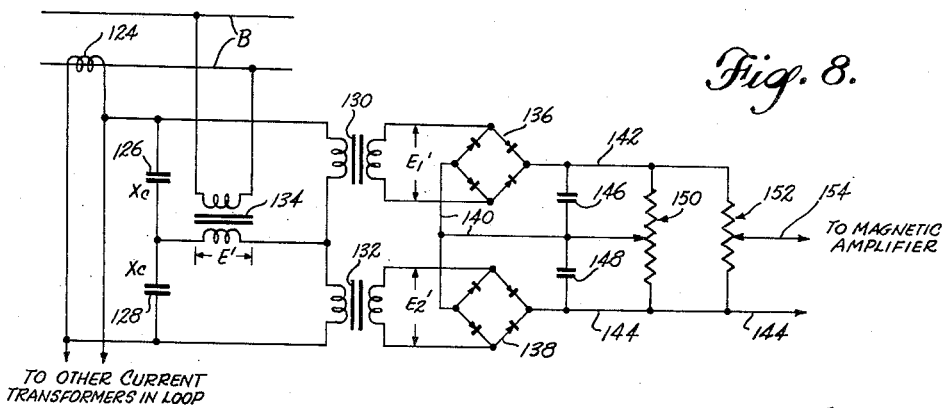
Figure 8 is a schematic diagram of a reactive power sensing circuit associated with an individual alternator.

The second control signal applied to the magnet amplifiers of Figure 7 represents the output of the respective reactive power sensors RPS1, RPS2 and RPS3. Each reactive power sensor circuit is or may be as shown in Figure 8. It comprises a current transformer 124 inductively linked with one of the alternator bus conductors B. Two similar reactance elements such as the identical condensers 126 and 128 are connected in series across the winding of current transformer 124. Also connected in series across this winding are the primaries of similar voltage transformers 130 and 132. The junction between the voltage transformer primaries is connected to one side of the secondary of the voltage transformer 134 and the junction between the two condensers 126 and 128 is connected to the opposite side of the secondary of this transformer. The primary of transformer 134 is connected across the alternator output bus conductors B. The secondary of transformer 130 is connected across the rectifier bridge 136 and the secondary of transformer 132 is connected across the rectifier bridge 138. Corresponding intermediate points of the respective bridges are interconnected by a conductor 140 to provide a neutral conductor. The bridge 136 has an output conductor 142 and the bridge 138 has an output conductor 144. A condenser 146 is connected between the conductors 142 and 140 and a similar condenser 148 is connected between the conductors 140 and 144. The winding of a potentiometer 150 is connected across conductors 142 and 144 and the adjustable wiper of this potentiometer is connected to conductor 140. The condensers 146 and 148, together with the potentiometer 150 provide a balanced output filter circuit. The winding of an output potentiometer 152 is connected across conductors 142 and 144. Output conductors from the reactive power sensor circuit as a whole comprise the conductor 154 connected to the wiper of potentiometer 152, and the conductor 144. Conductors 144 and 154 are connected across a separate control winding (not shown) in the associated magnetic amplifier. The circuit arrangement is such that the output voltage appearing across conductors 144 and 154 is of one polarity or the other depending upon the relationship of the voltages impressed on the circuit, and the magnitude of this output voltage is also dependent upon such voltages.

The input voltages applied to the circuit shown in Figure 8 comprise two separate but related voltages. One is the alternator or system voltage applied to the primary of transformer 134. The other represents the voltage across the current transformer 124 which in turn is related directly to the difference between current flow in the individual alternator bus and the average of current flow in all the alternator buses. That result is achieved by connecting the current transformers 124 in a series loop, as shown in Figure 7.

Figure 9:
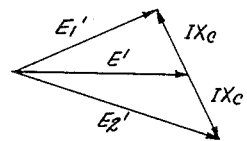
Figure 9 is a vector diagram illustrating operation of the circuit shown in Figure 8.

Referring to the vector diagram of Figure 9, it will be noted that the vector E' represents the secondary voltage of transformer 134. The vectors $IX_c$ represent respectively the voltage drops across condensers 126 and 128. The sum of these voltage drops, ignoring phasing, represents the voltage across the current transformer winding (124). It will be observed that the condensers constitute reactances and that the voltage drops across these condensers will be vectorially at right angles to the current flowing through them, which current is in phase or directly out of phase with the current flowing through the bus conductor inductively linked by the current transformer 124. Thus, if the current flowing in the alternator bus B is zero, the vectors $IX_c$ will likewise be zero and equal voltages will be developed across the secondaries of voltage transformers 130 and 132. Also if the current flowing in the alternator bus is purely real load current, ignoring the effect of current from the other current transformers, the vectors $IX_c$ will be perpendicular to the vector E', and the secondary voltages E1' and E2' of transformers 130 and 132, will be of equal magnitude. However, if the individual alternator is delivering some reactive load current there will be a component of each vector $IX_c$ which is in phase with or out of phase with the vector E', and the resulting voltages E1' and E2' will become unbalanced, resulting in an output voltage across output conductors 154 and 144. If now consideration is given to the effect of current flow in the other current transformers connected in series with the current transformer of the particular circuit under consideration, the vector $IX_c$ will have a component in phase with the vector E proportional to the difference between reactive power delivered by the particular alternator and the average of the reactive power delivered by all the alternators. Consequently, the output voltage appearing across conductors 144 and 154 will be proportional to such difference and will have one polarity if the particular alternator delivers more than its share of reactive power and the opposite polarity if the particular alternator delivers less than its share of reactive power.

In the event one of the alternators is disconnected from the system it is of course also desirable to disconnect or isolate electrically the reactive power sensing circuit and current transformer from the other reactive power sensing circuits and current transformers so that they will not impair operation of the latter in the residual system. For that purpose the current transformer 124 of alternator A1 connected in the current transformer loop is short-circuited, and its reactive power sensor RPS1 is shunted from the other reactive power sensors, by a switch 160 which is arranged to be closed by the mechanical connection BTM1 when the alternator A1 is disconnected from the other alternators. Closure of switch 160, therefore, effectively isolates this current transformer and reactive power sensor from the others without disturbing the interconnections between the latter, so that the remaining alternators and their associated control apparatus may be operated as a system, although one of reduced size. Similarly the current transformer 124 of alternator A2 connected in the loop is arranged to be short circuited by a switch 166 when bus tie breaker BT2 is opened, leaving intact the control circuits of alternators A1 and A3. A similar shunting switch 172 for the current transformer of alternator A3 functions in similar manner with respect to that current transformer.

From the foregoing it will be seen that the system disclosed in Figure 7 provides in connection with each alternator means by which the integral sum of voltage error signals and reactive power error signals are used to increase or decrease the excitation of the particular alternator so as to maintain equalization of reactive power among the alternators while regulating voltage of the system at a predetermined value determined by the average of the reference voltages individual to the respective voltage sensor circuits. Should one of the alternators be disconnected from the others by operation of its bus tie breaker for any reason the controls for that alternator are disconnected from the coordinated controls of the other alternators so as to permit independent operation of the disconnected alternator while permitting the remaining alternators to operate as a smaller system similar to the system which operated before the first alternator was disconnected.

It is, of course, readily possible to incorporate in a single system control apparatus combining the features of real power equalization and reactive power equalization, together with speed and voltage regulation respectively, as illustrated in Figure 12. In Figure 12 the control apparatus individual to a single alternator of a multiple alternator system is shown and the connections to the control apparatus components associated with the other alternators in the system are omitted for simplicity of illustration. However, it will be recognized that the switching arrangements and the interconnecting arrangements between corresponding devices may be as depicted in Figures 1 and 7. Components in Figure 12 which correspond to those described in connection with the preceding figures bear similar reference numerals with the exception that subscript numerals are omitted for purposes of generalization.

It will be recognized that the invention is not limited to the illustrative embodiments thereof but consists in certain combinations and subcombinations which the foregoing description and illustration point out by way of example. It will be noted that the illustrated load sensor, frequency sensor, reactive power sensor and voltage sensor circuits may be varied or replaced by equivalent devices, and that in lieu of magnetic amplifier means to perform the summation of control effects other adding means, with or without amplification, may be used. Also it will be appreciated that the function of integrating the appropriate control effects in order to position the prime mover control device in the case of real power equalization or, if used in order to establish alternator excitation in the case of reactive power equalization, may be performed at any of different points in the respective channels of control, including the sensors themselves, that is it may be performed either before or after the place of summation of the interrelated control effects involved. These and other variations are possible in practicing the novel principles of the invention for the equalization of real power while maintaining stably regulated frequency, and/or for the equalization of reactive power while maintaining stably regulated voltages, especially wherein the multiple alternator system may, where conditions so require, be divided, with the disconnected alternator or alternators being permitted to continue operation under control as to speed and/or voltage without affecting or being affected by the remainder of the system.

Likewise it will be recognized that the principles of the invention apply to equalization of power among other forms of power sources having a common load through which they are interconnected and requiring that they be operated at the same speed though they are driven by separate drive devices separately controllable to vary the driving force applied to the respective power sources and hence the proportion of total load assumed thereby.

I claim as my invention:

1. In a multiple alternator system, the combination comprising a plurality of alternators having predetermined load ratings, individual prime mover means for driving each alternator and including a control element actuatable to vary the drive torque applied to the alternator, tie bus means for connecting the alternators in parallel, tie bus circuit interrupter means individual to the respective alternators, said interrupter means being incorporated in said tie bus means and operable to disconnect any such alternator from the remaining alternators, combined speed regulation and load equalization control means individual to the respective alternators and actuatingly connected to the prime mover control elements thereof to vary the drive torque of the respective alternators up or down for maintaining speed thereof at a predetermined value while maintaining load equalization among the alternators, said speed regulation and load equalization control means for each alternator including individual load error sensing means connected to the load error sensing means of the other alternators for sensing the difference between loading of that alternator and average loading of all the alternators to produce a load error signal related to such difference, individual speed error sensing means connected to the speed error sensing means of the other alternators for sensing the difference between departure of actual speed of that alternator from a predetermined reference speed and the average of the similar departures for all the alternators to produce a speed error signal related to such difference, and means responsive to said load error sensing means and speed error sensing means of the particular alternator and actuatingly connected to the prime mover control element thereof to increase or decrease prime mover torque in accordance with both said load error and speed error signals for the particular alternator, and switching means incorporated in the connections between individual alternator load error sensing means and in the connections between individual alternator speed error sensing means, and operable with operation of said tie bus circuit interrupter of any alternator to isolate the load error sensing means and speed error sensing means from the respectively corresponding means of the remaining alternators while maintaining the operative connections between the load error sensing means and between the speed error sensing means of such remaining alternators, the speed error sensing means of each such alternator being adapted when disconnected from the other speed error sensing means to produce speed error signal applied to said actuating means for regulating speed of such alternator at said predetermined reference speed for that alternator.

2. In a multiple alternator system, the combination comprising a plurality of alternators having predetermined load ratings, individual prime mover means for driving each alternator and including a control element actuatable to vary the drive torque applied to the alternator, tie bus means for connecting the alternators in parallel, and combined speed regulation and load equalization control means individual to the respective alternators and actuatingly connected to the prime mover control elements thereof to vary the drive torque of the respective alternators up or down for maintaining speed thereof at a predetermined value while maintaining load equalization among the alternators, said speed regulation and load equalization control means for each alternator including individual load error sensing means connected to the load error sensing means of the other alternators for sensing the difference between loading of that alternator and average loading of all the alternators to produce a load error signal related to such difference, individual speed error sensing means connected to the speed error sensing means of the other alternators for sensing the difference between departure of actual speed of that alternator from a predetermined reference speed and the average of the similar departures for all the alternators to produce a speed error signal related to such difference, and means responsive to said load error sensing means and speed error sensing means of the particular alternator and actuatingly connected to the prime mover control element thereof to increase or decrease prime mover torque in accordance with both said load error and speed error signals for the particular alternator.

3. In a multiple alternator system, the combination comprising a plurality of alternators having predetermined reactive power ratings, individual exciter means for the respective alternators, means actuatable for controlling the respective exciters to vary the alternator excitation thereby, tie bus means for connecting the alternators in parallel, and combined voltage and reactive power equalization control means individual to the respective alternators and actuatingly connected to the voltage regulator means thereof to vary the individual alternator excitation up or down for maintaining voltage thereof at a predetermined value while maintaining reactive power equalization among the alternators, said voltage and reactive power control means for each alternator including individual reactive power error sensing means connected to the reactive power error sensing means of the other alternators for sensing the difference between reactive power being delivered by that alternator and average reactive power being delivered by all the alternators to produce a reactive power error signal related to such difference, individual voltage error sensing means connected to the voltage error sensing means of the other alternators for sensing the difference between departure of actual voltage of that alternator from a predetermined reference voltage and the average of the similar departures for all the alternators to produce a voltage error signal related to such difference, and means responsive to said reactive power error sensing means and voltage error sensing means of the particular alternator and connected for operating said actuating means thereof to increase or decrease alternator excitation in accordance with both said reactive power error and voltage error signals for the particular alternator.

4. In a multiple alternator system, the combination comprising a plurality of alternators having predetermined reactive power ratings, individual exciter means for the respective alternators, including control means actuatable for controlling the respective exciters to vary the alternator excitation thereby, tie bus means for connecting the alternators in parallel, tie bus circuit interrupter means individual to the respective alternators, said interrupter means being incorporated in said tie bus means and operable to disconnect any such alternator from the remaining alternators, combined voltage and reactive power equalization control means individual to the respective alternators and actuatingly connected to the exciter control means thereof to vary the individual alternator excitation up or down for maintaining voltage thereof at a predetermined value while maintaining reactive power equalization among the alternators, said voltage and reactive power control means for each alternator including individual reactive power error sensing means connected to the reactive power error sensing means of the other alternators for sensing the difference between reactive power being delivered by that alternator and average reactive power being delivered by all the alternators to produce a reactive power error signal related to such difference, individual voltage error sensing means connected to the voltage error sensing means of the other alternators for sensing the difference between departure of actual voltage of that alternator from a predetermined reference voltage and the average of the similar departures for all the alternators to produce a voltage error signal related to such difference, and means responsive to said reactive power error sensing means and voltage error sensing means of the particular alternator and connected for operating said actuating means thereof to increase or decrease alternator excitation in accordance with both said reactive power error and voltage error signals for the particular alternator, and switching means incorporated in the connections between individual alternator reactive power error sensing means and in the connections between individual alternator voltage error sensing means, and operable with operation of said tie bus circuit interrupter of any alternator to isolate the reactive power error sensing means thereof and voltage error sensing means thereof from the respectively corresponding means of the remaining alternators while maintaining the operative connections between the reactive power error sensing means and between the voltage error sensing means of such remaining alternators, the speed error sensing means of each such alternator being adapted when disconnected from the other voltage error sensing means to produce voltage error signals applied to said actuating means for regulating voltage of such alternator at said predetermined reference voltage for that alternator.

5. In a multiple alternator system, the combination comprising a plurality of alternators having predetermined load and reactive power ratings, individual prime mover means for driving each alternator and including a control element actuatable to vary the drive torque applied to the alternator, individual exciter means for the respective alternators, including control means actuatable for controlling the respective exciters to vary the alternator excitation thereby, tie bus means for connecting the alternators in parallel, combined speed regulation and load equalization control means individual to the respective alternators and actuatingly connected to the prime mover control elements thereof to vary the drive torque of the respective alternators up or down for maintaining speed thereof at a predetermined value while maintaining load equalization among the alternators, said speed regulation and load equalization control means for each alternator including individual load error sensing means connected to the load error sensing means of the other alternators for sensing the difference between loading of that alternator and average loading of all the alternators to produce a load error signal related to such difference, individual speed error sensing means connected to the speed error sensing means of the other alternators for sensing the difference between departure of actual speed of that alternator from a predetermined reference speed and the average of the similar departures for all the alternators to produce a speed error signal related to such difference, and means responsive to said load error sensing means and speed error sensing means of the particular alternator and actuatingly connected to the prime mover control element thereof to increase or decrease prime mover torque in accordance with both said load error and speed error signals for the particular alternator, and switching means incorporated in the connections between individual alternator load error sensing means and in the connections between individual alternator speed error sensing means, and operable with operation of said tie bus circuit interrupter of any alternator to isolate the load error sensing means and speed error sensing means from the respectively corresponding means of the remaining alternators while maintaining the operative connections between the load error sensing means and between the speed error sensing means of such remaining alternators, the speed error sensing means of each such alternator being adapted when disconnected from the other speed error sensing means to produce speed error signals applied to said actuating means for regulating speed of such alternator at said predetermined reference speed for that alternator, and combined voltage control and reactive power equalization control means individual to the respective alternators and actuatingly connected to the exciter control means thereof to vary the individual alternator excitation up or down for maintaining voltage thereof at a predetermined value while maintaining reactivve power equalization among the alternators, said voltage and reactive power control means for each alternator including individual reactive power error sensing means connected to the reactive power error sensing means of the other alternators for sensing the difference between reactive power being delivered by that alternator and average reactive power being delivered by all the alternators to produce a reactive power error signal related to such difference, individual voltage error sensing means connected to the voltage error sensing means of the other alternators for sensing the difference between departure of actual voltage of that alternator from a predetermined reference voltage and the average of the similar departures for all the alternators to produce a voltage error signal related to such difference, and means responsive to said reactive power error sensing means and voltage error sensing means of the particular alternator and connected for operating said exciter control means thereof to increase or decrease alternator excitation in accordance with both said reactive power error and voltage error signals for the particular alternator.

6. In a multiple alternator system, the combination comprising a plurality of alternators having predetermined load and reactive power ratings, individual prime mover means for driving each alternator and including a control element actuatable to vary the drive torque applied to the alternator, individual exciter means for the respective alternators, including individual exciter control means actuatable for controlling the respective exciters to vary the alternator excitation thereby, tie bus means for connecting the alternators in parallel, tie bus circuit interrupter means being incorporated in said tie bus means and operable to disconnect any such alternator from the remaining alternators, combined speed regulation and load equalization control means individual to the respective alternators and actuatingly connected to the prime mover control elements thereof to vary the drive torque of the respective alternators up or down for maintaining speed thereof at a predetermined value while maintaining load equalization among the alternators, said speed regulation and load equalization control means for each alternator including individual load error sensing means connected to the load error sensing means of the other alternators for sensing the difference between loading of that alternator and average loading of all the alternators to produce a load error signal related to such difference, individual speed error sensing means connected to the speed error sensing means of the other alternators for sensing the difference between departure of actual speed of that alternator from a predetermined reference speed and the average of the similar departures for all the alternators to produce a speed error signal related to such difference, and means responsive to said load error sensing means and speed error sensing means of the particular alternator and actuatingly connected to the prime mover control element thereof to increase or decrease prime mover torque in accordance with both said load error and speed error signals for the particular alternator, and switching means incorporated in the connections between individual alternator load error sensing means and in the connections between individual alternator speed error sensing means, and operable with operation of said tie bus circuit interrupter of any alternator to isolate the load error sensing means and speed error sensing means from the respectively corresponding means of the remaining alternators while maintaining the operative connections between the load error sensing means and between the speed error sensing means of such remaining alternators, the speed error sensing means of each such alternator being adapted when disconnected from the other speed error sensing means to produce speed error signals applied to said actuating means for regulating speed of such alternator at said predetermined reference speed for that alternator, combined voltage control and reactive power equalization control means individual to the respective alternators and actuatingly connected to the exciter control means thereof to vary the individual alternator excitation up or down for maintaining voltage thereof at a predetermined value while maintaining reactive power equalization among the alternators, said voltage and reactive power control means for each alternator including individual reactive power error sensing means connected to the reactive power error sensing means of the other alternators for sensing the difference between reactive power being delivered by that alternator and average reactive power being delivered by all the alternators to produce a reactive power error signal related to such difference, individual voltage error sensing means connected to the voltage error sensing means of the other alternators for sensing the difference between departure of actual voltage of that alternator from a predetermined reference voltage and the average of the similar departures for all the alternators to produce a voltage error signal related to such difference, and means responsive to said reactive power error sensing means and voltage error sensing means of the particular alternator and connected for operating said exciter control means thereof to increase or decrease alternator excitation in accordance with both said reactive power error and voltage error signals for the particular alternator, switching means incorporated in the connections between individual alternator load error sensing means and in the connections between individual alternator speed error sensing means, and operable with operation of said tie bus circuit interrupter of any alternator to isolate the load error sensing means and speed error sensing means from the respectively corresponding means of the remaining alternators while maintaining the operative connections between the load error sensing means and between the speed error sensing means of such remaining alternators, the speed error sensing means of each such alternator being adapted when disconnected from the other speed error sensing means to produce speed error signals applied to said actuating means for regulating speed of such alternator at said predetermined reference speed for that alternator, and switching means incorporated in the connections between individual alternator reactive power error sensing means and in the connections between individual alternator voltage error sensing means, and operable with operation of said tie bus circuit interrupter of any alternator to isolate the reactive power error sensing means thereof and voltage error sensing means thereof from the respectively corresponding means of the remaining alternators while maintaining the operative connections between the reactive power error sensing means and between the voltage error sensing means of such remaining alternators, the speed error sensing means of each such alternator being adapted when disconnected from the other voltage error sensing means to produce voltage error signals applied to said exciter control means for regulating voltage of such alternator at said predetermined reference voltage for that alternator.

7. In combination, a plurality of alternators connected electrically in parallel, a separate prime mover for each such alternator, separate frequency reference means for each alternator, having a predetermined reference frequency at least approximateily equal to the reference frequencies for the remaining alternators, frequency error sensing means including connections to the separate frequency reference means and operable to detect the differences between output frequency of the respective alternators and the average of the reference frequencies for all the alternators, load error sensing means operable to detect the differences between loading of the respective alternators and average loading of all the alternators, and prime mover control means for each alternator, operable to control the prime mover torque hence the loading of each alternator relative to the other alternators, each of said prime mover control means including means responsive to both the detected difference of the frequency error sensing means and to the detected difference of the load error sensing means of the particular alternator, to vary the prime mover torque applied thereto so as to maintain substantial equalization of load among the alternators while regulating frequency of the alternators substantially in accordance with the average value of said reference frequencies.

8. The combination defined in claim 7, and switch means interposed in the connections between the parallel-connected alternators and operable to disconnect any alternator from those remaining, switch means incorporated in the frequency error sensing means and operable to disconnect the separate frequency reference means of any disconnected alternator from the other frequency reference means for independent operation of said disconnected frequency reference means to control prime mover torque, thereby to regulate output frequency of such alternator independently of the other alternators, and switch means incorporated in the load error sensing means and operable to disconnect the load error sensing means of any such disconnected alternator from the other load error sensing means.

9. In combination, a plurality of alternators connected electrically in parallel, separate excitation means for each such alternator, separate voltage reference means for each alternator, having a predetermined reference voltage at least approximately equal to the reference voltages for the remaining alternators, voltage error sensing means including connections to the separate voltage reference means and operable to detect the differences between output voltage of the respective alternators and the average of the reference voltages for all the alternators, reactive power error sensing means operable to detect the differences between reactive power delivery of the respective alternators and average reactive power delivery of all the alternators, and excitation means control means for each alternator, operable to control the excitation means hence the excitation of each alternator relative to the other alternators, each of said control means including means responsive to both the detected difference of the voltage error sensing means and to the detected difference of the reactive power error sensing means of the particular alternator, thereby to vary the excitation of the alternator so as to maintain substantial equalization of reactive power delivery among the alternators while regulating voltage of the alternators substantially in accordance with the average value of said reference voltages.

10. The combination defined in claim 9, and switch means interposed in the connections between the parallel-connected alternators and operable to disconnect any alternator from those remaining, switch means incorporated in the voltage error sensing means and operable to disconnect the separate voltage reference means of any disconnected alternator from the other voltage reference means for independent operation of said disconnected voltage reference means to control excitation, thereby to regulate output voltage of the disconnected alternator independently of the other alternators, and switch means incorporated in the reactive load error sensing means and operable to disconnect the reactive load error sensing means of any such disconnected alternator from the other reactive load error sensing means.

11. In a method of operating a plurality of alternators in parallel, the step of varying the field excitation of the respective alternators up or down in accordance with both the difference between reactive power being delivered by the particular alternator and the average reactive power being delivered by all the alternators, and the difference between voltage of the alternators and a predetermined effective reference voltage, thereby to maintain equalization of reactive power and regulation of voltage of the alternators.

12. In a method of operating a plurality of alternators in parallel the step of increasing or decreasing prime mover torque in accordance with both the difference between loading of the particular alternator and average loading of all the alternators, and the difference between alternator output frequency and a predetermined reference frequency, thereby to maintain equalization of real power and regulation of frequency of the alternators, and the step of varying the field excitation of the respective alternators up or down in accordance with both the difference between reactive power being delivered by the particular alternator and the average reactive power being delivered by all the alternators, and the difference between voltage of the alternators and a predetermined effective reference voltage, thereby to maintain equalization of reactive power and regulation of voltage of the alternators.

13. In a system having a load and a plurality of individual power sources connected to said load to drive the same and by their common connection to said load, hence to each other, being constrained to operate at the same speed, each such power source having a separate driving device including a control element actuatable to vary the force applied by the associated driving device to the associated power source hence the power delivered by such power source to said load, and combined speed regulation and load equalization control means individual to the respective power sources and actuatingly connected to the control elements of the driving devices thereof, to vary the drive force applied by said driving devices to said power sources up or down for maintaining speed thereof at a predetermined value while maintaining load equalization among the power sources, said speed regulation and load equalization control means for each power source including individual load error sensing means connected to the load error sensing means of the other power sources for sensing the difference between loading of that power source and average loading of all the power sources to produce a load error signal related to such difference, individual speed error sensing means connected to the speed error sensing means of the other power sources for sensing the difference between the departure of actual speed of that power source from a predetermined reference speed and the average of the similar departures for all the power sources to produce a speed error signal related to such difference, and means responsive to said load error sensing means and speed error sensing means of the particular power source and actuatingly connected to the driving device control element thereof to increase or decrease the driving device force in accordance with both said load error and speed error signals for the particular power source.

References Cited in the file of this patent

UNITED STATES PATENTS

| | | | |
|---|---|---|---|
| Re. 20,548 | Doyle | | Nov. 9, 1937 |
| 1,018,322 | Jackson | | Feb. 20, 1912 |
| 1,713,168 | Byles | | May 14, 1929 |
| 1,714,656 | Burgess et al. | | May 28, 1929 |
| 1,762,672 | Spennemann | | June 10, 1930 |
| 2,435,419 | Bany | | Feb. 3, 1948 |
| 2,478,623 | Crary et al. | | Aug. 9, 1949 |
| 2,558,729 | Buechler | | July 3, 1951 |
| 2,636,132 | Stineman et al. | | Apr. 21, 1953 |
| 2,773,233 | Marcks | | Dec. 4, 1956 |
| 2,773,994 | Cohn | | Dec. 11, 1956 |
| 2,802,952 | Fairweather | | Aug. 13, 1957 |